I. E. CORWIN.
TIRE LOCK FOR LOCOMOTIVE WHEELS.
APPLICATION FILED OCT. 31, 1921. RENEWED JULY 31, 1922.

1,430,215.  
Patented Sept. 26, 1922.

INVENTOR  
Ira E. Corwin  
BY Adam E. Fisher  
ATTORNEY

Patented Sept. 26, 1922.

1,430,215

UNITED STATES PATENT OFFICE.

IRA E. CORWIN, OF JEROME, ARIZONA.

TIRE LOCK FOR LOCOMOTIVE WHEELS.

Application filed October 31, 1921, Serial No. 511,572. Renewed July 31, 1922. Serial No. 578,849.

*To all whom it may concern:*

Be it known that I, IRA E. CORWIN, a citizen of United States, residing in the city of Jerome and State of Arizona, have invented new and useful Improvements in Tire Locks for Locomotive Wheels, of which the following is a specification, reference being had to the accompanying drawings.

This invention is a tire lock for securing the tire of a locomotive driving wheel onto the wheel proper. As is well known, when such wheel becomes overheated the tires are apt to slip around the wheel; and it is the object of this invention to prevent such slipping.

Figure 1:
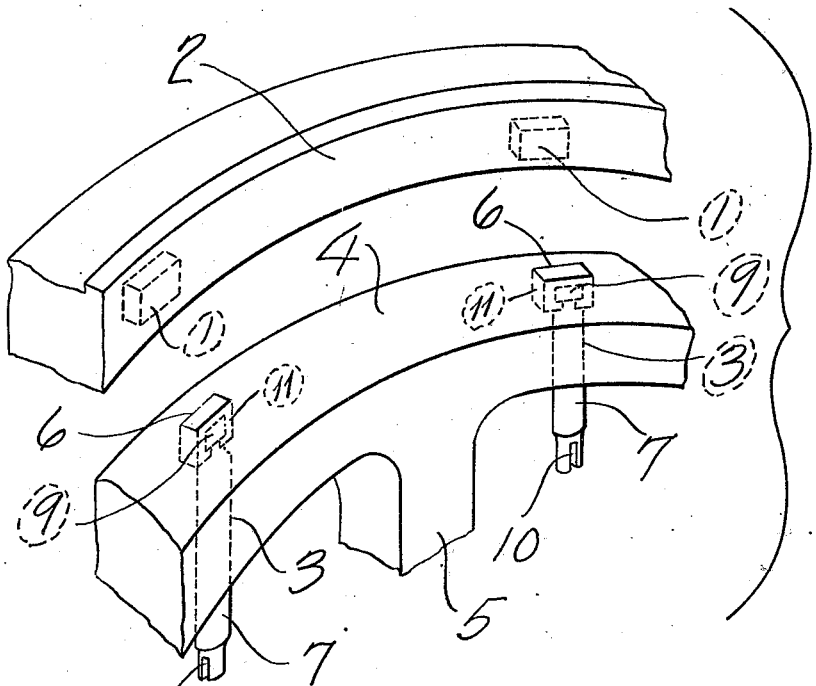
Figure 1 is a perspective view of a section of a wheel and tire equipped with this improvement.
Figure 2:
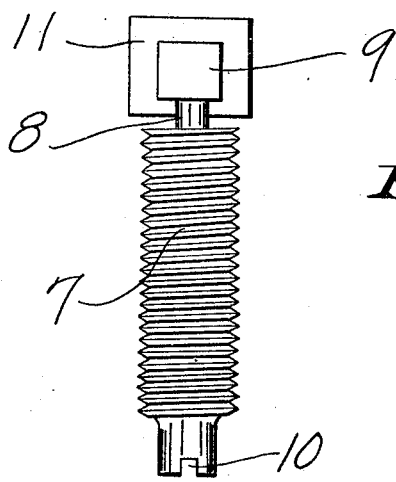
Figure 2 is a detail view of the fastener element detached from the wheel.

The invention consists in cutting a plurality of elongated recesses 1, spaced equally apart around the inner side of the tire 2, and a corresponding number of registering and threaded bores 3 radially through the rim 4 of the wheel 5, the outer ends of these bores being elongated, as shown at 6, to match the elongated recesses 1 of the tire. Threaded pins 7, having at one end the necks 8 and squared heads 9 rotatively mounted and secured on said necks, and at the opposite end the kerfs 10, are inserted through the bores 3, kerf end foremost, and through the outer face of the wheel inwardly. U-shaped, open sided yokes 11 are loosely mounted over the squared heads 9 and adapted to seat in the recesses 1 of the tire. By turning all the pins 7 with a screw driver in the kerfs 10, so as to withdraw the yokes 11 up into the elongated portions 6 of the bores 3, the tire 2 may be slipped onto the rim 4; after which the pins are screwed down or outwardly, thus forcing the yokes 11 out into the recesses 1 of the tire and locking the tire in place. The yokes 11, being loosely mounted, act to take care of any vibration, which otherwise would act directly upon the heads 9 and ultimately crystalize them and break them off.

While I have herein described a certain specific method of constructing and assembling the elements of my invention, it is understood same may be varied in minor details, not departing from the spirit of my invention as defined in the appended claims.

I claim:

1. In combination with a locomotive drive wheel and the tire thereof, the rim of the wheel having a threaded bore extended radially therethrough and the tire having an elongated recess on its inner side; a lock for the tire, same comprising a threaded pin set through the threaded bore of the rim, said pin having a neck portion and a squared head rotatively mounted on the neck portion; and a U-shaped yoke loosely mounted over the head and adapted to engage the recess in the tire.

2. In a tire lock for a locomotive drive wheel, the rim thereof having a threaded radial bore therethrough and the tire a recess on its inner side to meet the bore; a threaded pin to fit the bore of the rim, a squared head rotatively mounted at the outer end of the pin, and a U-shaped yoke loosely set on the said head and adapted to seat into the recess of the tire.

IRA E. CORWIN.

Witnesses:
J. S. JONES,
C. O. HARRIS.